United States Patent [19]
Svensson et al.

[11] 3,930,657
[45] Jan. 6, 1976

[54] DEVICE FOR SEALING BETWEEN PREFERABLY MOVABLE PARTS

[75] Inventors: Assar Natanael Svensson, Ersmark; Sture Valter Persson, Skelleftea, both of Sweden

[73] Assignee: Skega Aktiebolag, Ersmark, Sweden

[22] Filed: July 31, 1973

[21] Appl. No.: 384,350

[30] Foreign Application Priority Data
Aug. 7, 1972 Sweden............................ 10246/72

[52] U.S. Cl............................................ 277/188 A
[51] Int. Cl.² ........................................ F16J 15/24
[58] Field of Search..................... 277/188, 177, 176

[56] References Cited
UNITED STATES PATENTS

| | | | |
|---|---|---|---|
| 1,686,090 | 10/1928 | MacClatchie.................... | 277/188 |
| 2,456,356 | 12/1948 | Aber............................... | 277/176 |
| 2,927,804 | 3/1960 | Snyder et al.................... | 277/188 X |
| 3,188,099 | 6/1965 | Johnson et al.................. | 277/188 |
| 3,582,093 | 1/1971 | Lucien........................... | 277/188 |

FOREIGN PATENTS OR APPLICATIONS

| | | | |
|---|---|---|---|
| 1,193,987 | 11/1959 | France........................... | 277/188 |

*Primary Examiner*—Samuel B. Rothberg
*Attorney, Agent, or Firm*—Elliott I. Pollock

[57] ABSTRACT

A device for producing a seal between movable and/or stationary parts, such as a piston and a cylinder particularly under conditions of high fluid pressures, comprises a sealing ring having an O-ring configuration and fabricated of a material such as rubber. A support ring is disposed on at least one side of the sealing ring in coaxial relation thereto, the support ring being fabricated of a thermoplastic polymer material having a hardness greater than the sealing ring and being formed with a concavely curved contact surface facing and engaging the sealing ring. A guide ring having an L-shaped cross section is disposed outside of the support ring relative to the sealing ring in coaxial relation to the sealing and support rings, and consists of a polymer material having a hardness greater than the thermoplastic polymer of the support ring. The guide ring includes a side surface in planar engagement with a planar contact surface formed on the support ring on the side thereof opposite to the concavely curved contact surface, the engaged planar surfaces having substantially the same dimensions in a radial direction, and the said guide ring also defines a peripheral sliding surface extending substantially perpendicular to its said side surface and having an axial dimension greater than the axial dimension of the support ring. The sealing ring, support ring, and guide ring are mutually displaceable relative to one another and have no mutual interconnections therebetween.

3 Claims, 1 Drawing Figure

U.S. Patent   Jan. 6, 1976   3,930,657
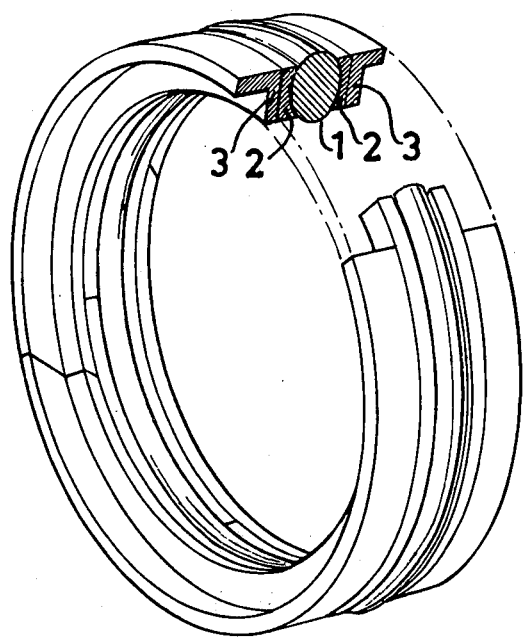

DEVICE FOR SEALING BETWEEN PREFERABLY MOVABLE PARTS

This invention relates to a device for sealing between preferably movable parts, for example between a piston and a cylinder, and particularly when high pressures can be involved, the sealing device comprising a sealing ring, for example of O-ring type, and associated support and guide rings, which different types of rings are made of materials with different hardness.

A great variety of sealing devices comprising to that type of sealings which can be related to sealing rings are already known. All of them have in common the object of preventing to the greatest possible extent any leakage between two or more parts which are stationary or movable relative each other, in order to establish seal between a part to which no pressure is applied and a part to which pressure is applied. The most widely used type of these known sealing rings is the so-called O-ring, which is intended to be placed in position, for example in a piston, to seal against the surface of the associated surrounding cylinder. This type of sealing can advantageously be utilized at pressures up to 100 kp/cm² or somewhat higher. At pressures above said pressure the O-ring cannot be utilized separately because of the yielding risk, but the ring must be used in combination with a support ring disposed on one and/or the other side. The support ring normally consists of rubber or another polymer material, and its object is to prevent the O-ring from flowing out into the gap between, for example, a piston and an associated cylinder. As regards an example of such a sealing device, reference is made to the Swedish Pat. No. 221,178.

A sealing device of the aforesaid kind, however, shows certain disadvantages, e.g. it cannot take up any lateral forces. This disadvantage, however, has been eliminated by combining this type of said with one or more guide rings of acetal resin or polytetrafluoroethylene disposed in separate grooves in spaced relationship to the sealing ring accordingly proper. The guide ring or rings act as sliding bearings. In a further development, the support rings are vulcanized on the sealing ring and consist usually of fabric, while the guide rings are intended to be placed into the same groove or position as the sealing ring and the supporting rings vulcanized thereon.

All of the aforementioned and known sealing rings and so-called compact sealings, however, to which the last mentioned sealing device can be related, show certain disadvantages, which together limit the service life of the known sealing devices and also bring about relatively great friction losses.

The object of the present invention is to produce a device for sealing between two parts, stationary or movable relative each other, which has a substantially longer service life and substantially smaller friction losses than conventional sealing devices of the aforesaid types.

By employing the present invention it is possible to obtain a sealing device of incomparably longer service life and with less damages on the parts, between which the sealing devices is intended to seal, than all heretofore known sealings and combinations of sealing members. Comparative tests with reciprocatory movement at a pressure of 250 bar have proved in a clear and highly surprising manner, that the sealing device according to the invention has a service life exceeding that of known corresponding sealings four to five times, and that it has substantially smaller friction losses than said known sealings.

The invention is described in greater detail in the following, with reference to the accompanying drawing, which shows an embodiment of the invention selected only to serve as an example.

In the drawing, 1 designates a sealing ring, which consists of rubber, preferably nitrile rubber, possibly with flock reinforcement, having a round, oval, elliptic or polygon cross-section. This sealing ring, shown in the form of an O-ring, is disposed loosely between two support rings 2, which have an inwardly curved or smooth surface towards the sealing ring and consist of a material having a higher hardness than the sealing ring, for example a polymer material of the thermoplastic polyester type. Outside of the support rings 2 guide rings 3 are disposed which, as the support rings 2 and sealing ring 1, are arranged loosely in relation to the respective ring disposed inside thereof. The guide rings 3 consist of a material having a higher hardness than the support rings 2 located inside thereof, preferably acetal resin or polytetrafluorolthy. Said guide rings 3, as shown in the drawing, should have a radial extension substantially in agreement with the radial extension of the support rings 2, while the sealing ring in a manner known per se is given a certain excess dimension for the initial sealing pressure. It was found suitable in this conjunction to give the sealing ring a cross-sectional area which in relation to the inner diameter is greater than it is apparent from SMS 1586. The guide rings 3, furthermore, as also appears from the drawing, may be given an L-shape, with one leg lowered into a groove or the like, so that its surface serving as a sliding surface lies on the same level as or slightly above the surface of that part, at which the device according to the invention is intended to be placed. The advantage achieved by the present invention, as already mentioned before, is that the device has a service life substantially exceeding that of known sealings of a corresponding type and causes substantially smaller friction losses than said sealings. Furthermore, by disposing the rings comprised in the device according to the invention loosely in relation to each other, there will be no detaching forces, i.e. no internal stresses in the sealing device proper will occur.

The present invention is not restricted to the embodiment described above and shown in the drawing, but can be modified and altered in many different ways within the scope of the claims. The sealing ring comprised in the device, for example, may be unsplit and the other ring types may be split, whereby the further advantage is obtained that the device according to the invention can be applied to an undivided piston without requiring the sealing ring to be split which, however, is the case in the heretofore most widely used compact seal. The device according to the invention, further, may comprise a sealing ring associated with only one support ring and a guide ring, the two latter rings being disposed on the same side of the sealing ring.

What we claim is:

1. A device for producing a seal between movable and/or stationary parts which are subjected to high fluid pressures, said device comprising a sealing ring in the form of an O-ring, a pair of separate spaced support rings disposed on opposite sides of said sealing ring respectively in coaxial relation thereto, each said support ring consisting of a thermoplastic polymer material having a hardness greater than that of the material of the sealing ring, said support rings being formed with concavely curved contact surfaces respectively disposed towards and conforming to opposite sides of said sealing ring and each loosely engaging one side of said sealing ring, each said support ring having a second contact surface disposed essentially parallel to a radial plane through the device, and a pair of spaced guide rings coaxial with said sealing and support rings, each said guide ring being disposed outside of an associated one of said support rings relative to said sealing ring and consisting of a polymer material having a hardness greater than that of the thermoplastic polymer of the said associated support ring, each of said guide rings having a pair of side surfaces which are essentially plane-parallel to one another and to said radial plane, one of said side surfaces substantially fully engaging said second contact surface of said associated support ring and having essentially the same radial extension as said second contact surface, and each said guide ring also having a peripherally arranged sliding surface extending essentially perpendicular to both of its said side surfaces and having a larger axial extension than that of said associated support ring, said sealing ring, support rings, and guide rings being arranged adjacent to one another in axially and radially mutually displaceable relation to one another and without interconnection therebetween.

2. The device according to claim 1 wherein each guide ring is L-shaped in cross section.

3. The device of claim 1 wherein said sealing ring is fabricated of a material such as nitrile rubber, each support ring is fabricated of a thermoplastic polyester, and each guide ring is fabricated of a material such as acetal resin, polytetrafluoroethylene, or the like.

* * * * *